May 5, 1931.  C. R. BOGGS ET AL  1,804,199
RUBBER COMPOUND AND ARTICLES
Filed April 6, 1926
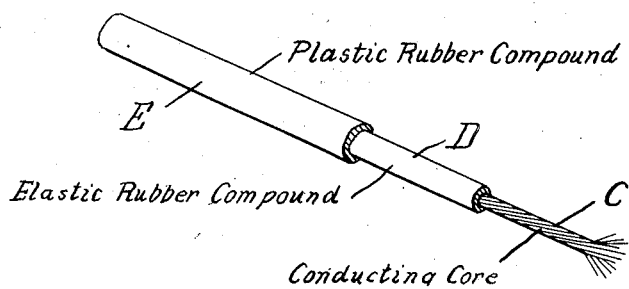
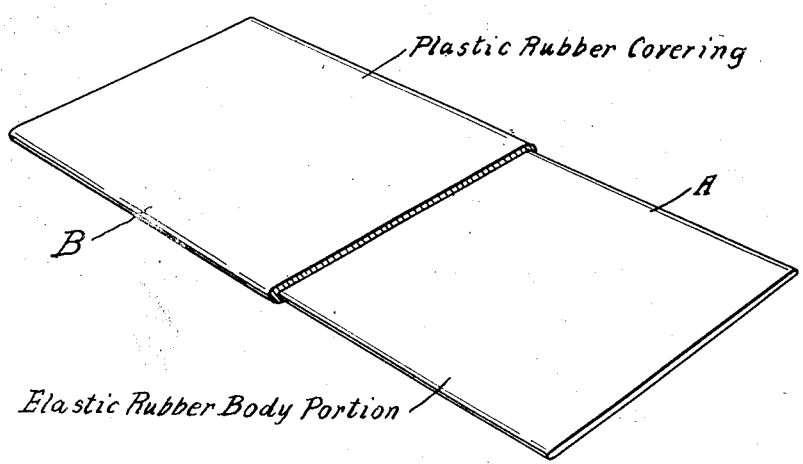
INVENTORS
Charles R. Boggs
John T. Blake
BY
Pennie Davis Marvin & Edmonds
ATTORNEYS Patented May 5, 1931

1,804,199

UNITED STATES PATENT OFFICE

CHARLES R. BOGGS, OF WABAN, AND JOHN T. BLAKE, OF BOSTON, MASSACHUSETTS, ASSIGNORS TO SIMPLEX WIRE & CABLE COMPANY, OF BOSTON, MASSACHUSETTS, A CORPORATION OF MASSACHUSETTS

RUBBER COMPOUND AND ARTICLES

Application filed April 6, 1926. Serial No. 100,195.

Our invention relates to the protection of rubber and rubber-containing products from ozone and ozone-containing atmospheres. Our invention provides new products which, to a remarkable extent, resist the action of ozone.

Rubber and rubber compounds are used in electrical insulation in many cases where the electrical stress is sufficient to produce ozone. Instances which might be given would include high tension testing leads and connections, the protective testing mats which are used in front of switchboards, and the high tension cables used in electrical ignition systems of internal combustion engines, as well as high tension rubber insulation generally. Ozone has a peculiarly destructive action on the usual types of rubber compounds, and as a result such compounds, for example in the instances mentioned above, are very short lived or are useful for their intended purpose for but a short time.

While we do not predicate our invention upon any particular explanation of the chemical action involved, ozone apparently reacts with rubber to form compounds which do not have the elastic properties characteristic of properly vulcanized rubber. These embrittling products may perhaps be ozonides. However that may be, we have observed that the usual rubber compounds when exposed to the action of ozone become brittle and split and crack. We have also observed that the deterioration is particularly marked when the rubber or rubber compound is at the time under internal mechanical stress, for example when it is under tension.

As a result of our investigations, we have discovered that gums of rubber character, especially as regards their resistance to attack by ozone will resist the action of ozone if during the period of exposure they are absolutely at rest so that they are entirely free from internal stresses.

The usual vulcanized rubber compounds are elastic; that is, they will yield to an extending or compressing force (assuming the force to be within the limits of the physical strength of the compound) only for the period the force is applied during which period corresponding internal stresses will be set up within the compound. Due to this property, rubber products in practical use are almost without exception, and necessarily so, subject to internal stress. The elastic properties of vulcanized rubber compounds are essential to give them the physical characteristics necessary for practical purposes. For example, when a wire insulated with a rubber compound is flexed or bent the rubber insulation is subject to internal stress at the point of bending or flexure and when a rubber mat is laid over an uneven surface it is subject to internal stress in conforming to the irregular surface yet in each case the rubber compound must have the strength and elasticity to withstand mechanical loads which otherwise might cause it to break or rupture.

According to our invention, however, we employ an elastic portion having the physical properties requisite to the use to which the product is to be put and protect this elastic portion with a plastic covering containing a gum or gums of rubber character. The plastic covering compound flows when subject to stress so that it automatically adjusts itself to eliminate internal stresses, and we have found, in accordance with our discovery just stated, that this plastic covering will resist the action of ozone and further that it will protect the elastic rubber-containing portion which it covers from the effect of ozone.

Accordingly, our invention provides composite rubber products having important advantages in resistance to ozone which are made up of an elastic portion giving the product its desired physical characteristics covered and protected with a plastic portion free from internal stress resistant to the action of ozone and protecting the elastic portion from the action of ozone.

For practical purposes, products embodying our invention assume a wide variety of forms. We will describe two, but it will be understood that we do not limit our invention thereto as these two are given as examples. We will describe an insulated cable and a rubber mat each embodying our invention. Our invention is of special value and application in connection with insulated electrical cables, and our invention includes insulated cables the insulation of which is protected in accordance with our invention.

In describing more in detail these two examples, we will refer to the accompanying drawings which illustrate in a diagrammatic manner, in Fig. I, a section of insulated cable embodying our invention and, in Fig. II, a mat embodying our invention with part broken away.

A rubber mat embodying our invention may comprise a body portion of a vulcanized elastic rubber compound approximately of the size and shape desired and having sufficient tensile strength and resistance to tearing to withstand use and handling covered with a plastic compound containing gum of a rubber character advantageously comparatively thick to withstand abrasion. Such a mat is shown in Fig. II, where the elastic body portion is designated A and the plastic covering B. An insulated cable embodying our invention may comprise a conducting core, for example of stranded copper wire, a layer of insulation of a vulcanized elastic rubber compound, and a covering layer of a plastic compound containing gum of a rubber character. Such a cable is shown in Fig. I, where the conducting core is designated C, the elastic layer of the insulation D and the plastic layer of the insulation E.

One suitable plastic compound we have used comprises—

35 parts balata
5 parts reclaimed rubber (50% rubber)
60 parts vegetable or animal oil substitute This compound can be used, unvulcanized, as the plastic covering and protecting compound, for example, in the manufacture of either the mats or the insulated cables just described. Other suitable plastic compounds can be made by substituting a mixture of equal parts of balata and chicle for the balata. Additional fillers, such as mineral rubber and zinc oxide, can also be used. Such compounds can also be used as the plastic protective covering when small amounts of sulphur have been added, for example 5/32 parts, and when partially vulcanized, but we find it more advantageous to use them unvulcanized. Either inorganic or organic accelerators can also be used in such partial vulcanization.

The elastic portion of the composite rubber products of our invention may be made of any of the rubber compounds now in use for such purposes, and these compounds may be vulcanized in the usual way. We are giving the following simply as examples of suitable compounds which we have used:

5 parts plantation rubber
45 parts reclaimed rubber (50% rubber)
20 parts whiting
2 parts litharge
2 parts zinc oxide
25 parts mineral rubber
1 part paraffine
1/8 part tetramethylthiuramsulphide
1½ parts sulphur and 24 parts plantation rubber
38 parts whiting
10 parts zinc oxide
4 parts litharge
2 parts paraffine
1/16 part oxidized lead salt of dimethyldithiocarbamic acid.
1 3/10 parts sulphur Either of these compounds, vulcanized, can be used as the elastic body portion of the mats or as the inner elastic layer of insulation on the insulated cables we have described.

We have stated that we have found it more advantageous to employ the plastic compound in the unvulcanized state. In the manufacture of the composite products of our invention, the plastic covering can be applied after the body portion of the product, for example the body portion of the mats or the conducting core with the inner layer of insulation of the cables, has been subjected to vulcanization; or by using a plastic compound free from sulphur available to vulcanize rubber present therein or by using an elastic compound containing an active vulcanization accelerator so that it vulcanizes much more rapidly than the plastic compound, the plastic compound can be applied before the elastic compound is vulcanized and the composite products then subjected to vulcanizing conditions until the elastic compound is properly vulcanized.

It will be apparent from the foregoing description that in one particularly advantageous form, the composite product of our invention comprises a body portion of vulcanized gum with a protective covering of unvulcanized gum. The vulcanized gum or gum compound gives the product its desired physical properties and the unvulcanized rubber or rubber compound protects the body portion from ozone and imparts to the product resistance to ozone, being plastic in nature.

A test we have employed for evaluating the resistance of various rubber products to ozone consists in subjecting the product under mechanical tension to air containing a high and measured portion of ozone and observing the period of time required maintaining the conditions of exposure constant for deterioration to become noticeable. We have employed air containing 16 grams of ozone per cubic meter at room temperature, about 21° C. The usual rubber compounds on wire bent about its own diameter will show marked deterioration in this atmosphere in a few minutes. An insulated wire comprising 26 strands of #30 B. & S. gauge tinned copper wire covered to a diameter of 7/32 inch with the first of the elastic compounds described above, vulcanized, and then with an additional covering 1/32 inch thick of the first of the plastic compounds described above bent into helix around its own diameter exhibited no apparent change in physical characteristics after exposure to this atmosphere for periods of from 4 to 6 hours. The concentration of ozone employed is extremely high compared to normal working conditions and this is a highly accelerated test with reference to normal resistance to ozone.

While our invention relates particularly to the protection of rubber and similar gums and products containing them from ozone, it will be apparent that in one aspect our invention is of somewhat broader application and that it can be employed more generally in affording improved resistance to ozone. Where a product or article is to be protected from ozone, whether or not it contains rubber, it can be covered with a plastic rubber compound of the type we have found to resist ozone.

We claim:

1. An improved composite product adapted to resist ozone comprising a body portion containing vulcanized gum and a covering therefor containing unvulcanized gum of rubber character.

2. An improved composite gum product adapted to resist ozone comprising a body portion containing vulcanized gum and a covering therefor containing unvulcanized rubber.

3. An improved composite gum product adapted to resist ozone comprising a body portion containing vulcanized gum and a covering therefor containing unvulcanized balata.

4. An improved composite gum product adapted to resist ozone comprising a body portion containing vulcanized gum and a covering therefor containing unvulcanized chicle.

5. An improved composite gum product adapted to resist ozone comprising an elastic gum-containing body portion and a covering therefor containing ozone resistant gum of rubber character, the said covering being substantially free from internal stresses.

6. An improved composite product adapted to resist ozone comprising a body portion to be protected form ozone and a covering therefor containing ozone resistant gum of rubber character, the said covering being substantially free from internal stresses.

In testimony whereof we affix our signatures.

CHARLES R. BOGGS.
JOHN T. BLAKE.